(12) United States Patent
DeFuria et al.

(10) Patent No.: US 7,353,389 B2
(45) Date of Patent: Apr. 1, 2008

(54) SOFTWARE UPDATE AND PATCH AUDIT SUBSYSTEM FOR USE IN A COMPUTER INFORMATION DATABASE SYSTEM

(75) Inventors: Richard M. DeFuria, Acton, MA (US); Gary H. Newman, Concord, MA (US)

(73) Assignee: Bellarc, Inc., Maynard, MA (US)

( * ) Notice: Subject to any disclaimer, the term of this patent is extended or adjusted under 35 U.S.C. 154(b) by 799 days.

(21) Appl. No.: 10/819,545

(22) Filed: Apr. 7, 2004

(65) Prior Publication Data

US 2004/0230828 A1 Nov. 18, 2004

Related U.S. Application Data

(60) Provisional application No. 60/461,007, filed on Apr. 7, 2003.

(51) Int. Cl.
*G06F 9/00* (2006.01)
(52) U.S. Cl. ...................... 713/168; 713/193
(58) Field of Classification Search ............... 713/168, 713/193
See application file for complete search history.

(56) References Cited

FOREIGN PATENT DOCUMENTS

EP 0957617 11/1999

OTHER PUBLICATIONS

Start K et al., "The distribution management of service software" Computer Standards and Interfaces, vol. 17, No. 3, Jun. 1995, pp. 291-301.

*Primary Examiner*—Thomas R. Peeso
(74) *Attorney, Agent, or Firm*—Cesari and McKenna, LLP

(57) ABSTRACT

A Computer Information Database System includes a software update and patch audit subsystem that manages computer profile data using system grouping and audit specification criteria. The subsystem thus selects a particular group of computers using the grouping criteria, and further selects from within the group the computers that pass or fail the applicable audit requirements. A given computer passes the requirements if the computer has installed thereon the specified software updates and patches that are applicable to the computer operating system platform. Otherwise, the computer fails. The audit subsystem may instead select particular computers using the audit specification criteria and then using the grouping criteria further select the subset of these computers that belong to a particular group. Further, the audit specification criteria may be set differently for the respective groups. Also, the grouping criteria and/or the security audit criteria may change without adversely impacting the operations of the subsystem. The audit system uses database tables and views that include value-to-match fields for either or both of the grouping and the audit specification criteria, and also software update or patch specific information and/or operating system specific information. One table includes group and operating system information for the respective computers, another table includes entries for the respective updates and patches that are installed on the respective computers, and another table includes entries that together specify the security audit specifications for the respective groups. Using the tables, the system produces views that relate, for example, to failing computers, what updates or patches the respective failing computers are missing, which or how many computers are failing within a particular group.

13 Claims, 7 Drawing Sheets

COMPUTERS TABLE

| Id | GroupName | OperatingSystem | OSProductOptions | OSServicePack | OSBuild |
|---|---|---|---|---|---|
| 554454C4C-5900-1058-8030-C8C04F573131 | Acme1 | Windows XP | Professional | Service Pack 1 | 2600 |

*FIG. 2*

HOTFIXES TABLE

| Id | Name | Desc. | InstallDate | QNumber | Type | Path | Status |
|---|---|---|---|---|---|---|---|
| 554454C4C-5900-1058-8030-C8C04F573131 | Q314147 | NULL | 2002-07-08 13:00:00 | Q314147 | Update | Windows XP\SP1\ | 1 |
| 302 | 303 | 304 | 305 | 306 | 307 | 308 | 309 |

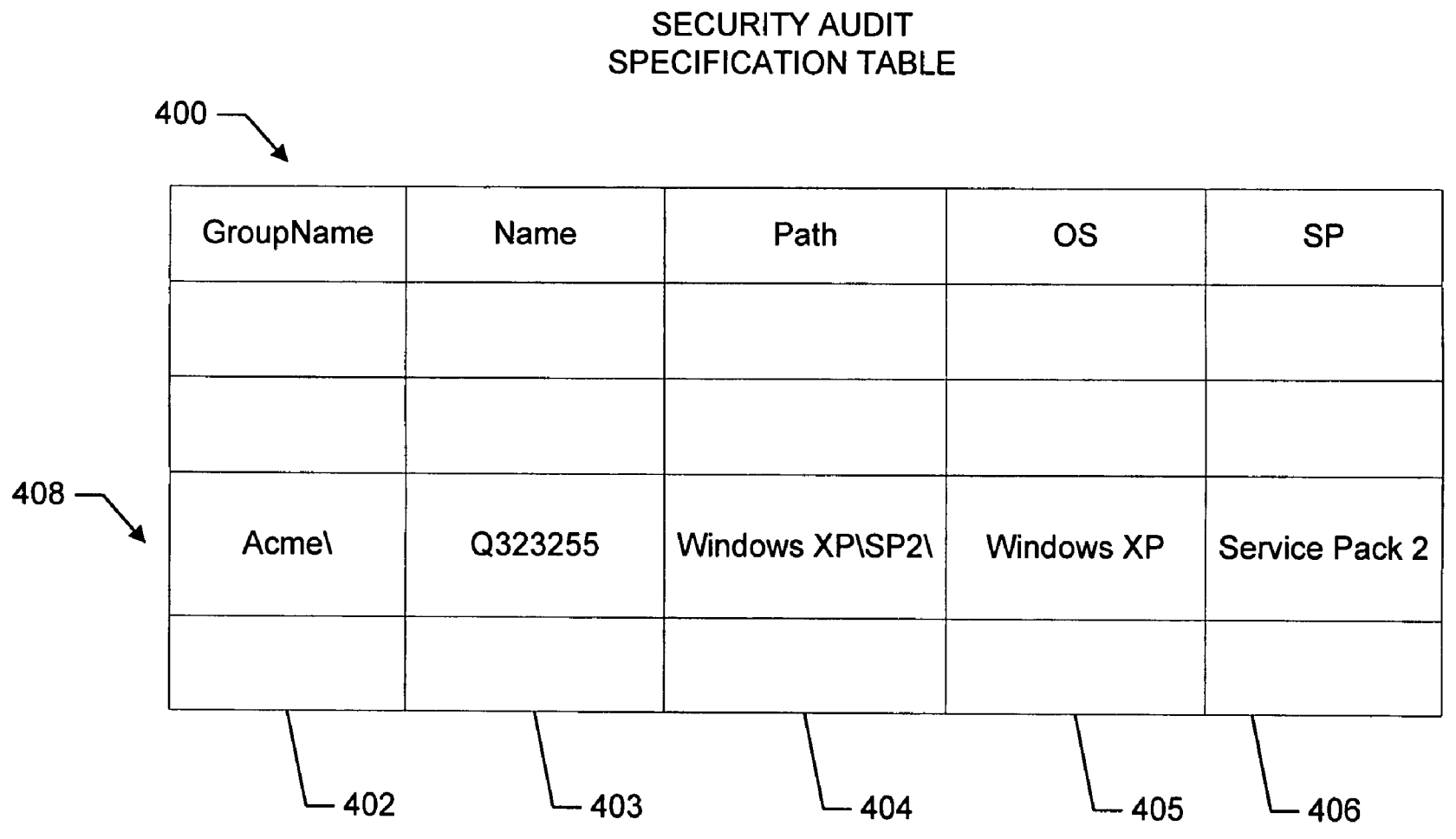

SECURITY AUDIT SPECIFICATION TABLE

| GroupName | Name | Path | OS | SP |
|---|---|---|---|---|
| Acme1 | Q323255 | Windows XP\SP2\ | Windows XP | Service Pack 2 |
| 402 | 403 | 404 | 405 | 406 |

*FIG. 4*

SecurityAudit View ← 702

| GroupName | Name | Path | Count | OS | SP | QNumber |
|---|---|---|---|---|---|---|
| | | | | | | |
| Acme\Ohio\ | Q323255 | Windows XP\SP2\ | 7 | Windows XP | Service Pack 2 | Q323255 |
| | | | | | | |

FIG. 7

SOFTWARE UPDATE AND PATCH AUDIT SUBSYSTEM FOR USE IN A COMPUTER INFORMATION DATABASE SYSTEM

The present application claims the benefit of U.S. Provisional Patent Application Serial No. 60/461,007, which was filed on Apr. 7, 2003, by Richard M. DeFuria and Gary H. Newman for SECURITY AUDIT IMPROVEMENT IN A COMPUTER INFORMATION DATABASE SYSTEM, and is hereby incorporated herein by reference.

BACKGROUND OF THE INVENTION

1. Field of the Invention

The invention relates generally to systems and methods of managing profile data for a plurality of computers and, more particularly, to systems and methods of managing profile data to conduct and report the results of software update and patch audits.

2. Background Information

A computer profile includes computer configuration data, such as data that identifies the computer hardware and software. The profile may also include other information, such as, for example, associated software license information, performance data, and other user specified data. In a prior system for managing a computer information database that contains computer profile data, a profile group managing server manages the data according to a tree-structured grouping of the computers. The tree structure, which is designated by the system administrator, may, for example, follow the organizational chart of a company, with the top level node, or group, corresponding to the company and lower level nodes, or groups, corresponding to the various branch offices, and so forth. In the example, the computers may be grouped according to their IP subnets that correspond to the branch offices. The profile group managing server then manipulates the profile data to produce reports that summarize the attributes of the computers at every group level, with reports for a given group including the profile data for all computers in the sub-tree that has the group as its root. A user can then utilize the summaries that are of interest. In the example, a user in a particular branch office may be interested only in information for the computers in that office, and thus, use only reports produced for the particular branch office's group. However, a user in the company head office may be interested in information for all company computers, and thus, use the reports produced for the company group. One such computer information database management system is the BelManage system (version 6) produced by Belarc, Inc., of Maynard, Mass., which is the Assignee of the current invention.

One of the major problems in managing networks as a whole and the various groups within the network is ensuring that network security is maintained through the installation of required software updates and patches, such as, for example, Microsoft Hotfixes and Service Packs. In a similar way, it is a major problem to ensure that non-security related software updates and patches, such as those repair program errors that impact employee productivity, are installed. For convenience, we refer to the respective updates and patches hereinafter as "hotfixes" and the related audits as "security audits."Certain hotfixes may be appropriate for the entire network, while others are appropriate for certain groups of computers or for particular computers within the groups, depending on the operating system platforms to which the respective hotfixes apply and/or the dictates of the network system administrator or the administrators of the various groups. The network management problems are further compounded by changes to the group memberships, alterations to operating system platforms, releases of new hotfixes, changes to the network and/or group security/hotfix requirements, and so forth. Accordingly, using prior systems, it is a major undertaking to perform the security audits, that is, to determine if the respective computers and/or groups thereof comply with applicable network security/hotfix requirements and to report the results in a meaningful way.

SUMMARY OF THE INVENTION

The current system includes a software update and patch audit subsystem that manages computer profile data using system grouping and audit specification criteria. The subsystem thus selects a particular group of computers using the grouping criteria, and further selects from within the group the computers that pass or fail the applicable audit requirements. A given computer passes the requirements if the computer has installed thereon the specified updates and patches, for example, specified Microsoft Hotfixes, that are applicable to the computer's operating system and service pack. Otherwise, the computer fails. For ease of understanding, we refer hereinafter to the updates and patches generically as "hotfixes." Further, we refer to the software update and patch audits, which relate to security-related updates and patches as well as other updates and patches, hereinafter generically as "security audits" and to the software update and patch subsystem as a "security audit subsystem."

The security audit subsystem may instead select particular computers using the audit specification criteria, for example, it may select all of the computers that fail certain or all of the audit specification criteria, and then using the grouping criteria further select the subset of these computers that belong to a particular group. Further, the audit specification criteria may be set differently for the respective groups, as discussed in more detail below.

The security audit system uses various database tables and views to make the selections of passing and failing computers in the various groups. More specifically, the security audit subsystem maintains security audit database tables that include value-to-match fields for either or both of the grouping and the audit specification criteria, and hotfix specific and/or operating system specific information. The security audit subsystem maintains a "Computers Table" that includes group and operating system information for the respective computers. The Computers Table includes one entry per computer. The entry includes fields for a computer unique Id and the assigned group name, as well as fields for the operating system name, product option data, service pack version, and system build number.

The security audit subsystem further maintains a Hotfixes Table that includes entries for the respective hotfixes that are installed on the computers. An entry in the Hotfixes Table includes fields for the unique computer Id and the name of the hotfix, as well as fields for information relating to the installation and operation of the hotfix, such as, installation date, path, and so forth. The hotfix-related information for the Hotfixes Table is taken from the registries on the respective computers. The Id fields of the two tables, which each identify the computers by their unique computer Ids, relate entries in the Hotfixes Table to the entries in the Computers Table with the same Id. The security audit subsystem also maintains a Security Audit Specification Table that includes entries that together specify the security audit specifications for the respective groups. An entry in the Security Audit Specification Table includes fields for the group name and the name of a hotfix, and fields for hotfix installation-specific information such as the path. The table further includes fields that specify the operating system platform to which the hotfix applies, that is, the name of the operating system and the applicable service pack information. As discussed in more detail below, the subsystem determines the platform-related information based on the hotfix details that are included in the Hotfixes Table.

The security audit subsystem uses the tables to produce various views of the database. For example, the subsystem may produce a view that includes for each computer in the database the set of hotfixes that have not been installed. The subsystem may also or instead produce a view that includes for each group the set of computers that does not comply with the applicable security audit specification. Alternatively or in addition, the security audit subsystem may produce a view that includes the number of computers for which an applicable hotfix is not installed.

Various reports may be generated to show, for example, how many of the computers failed the security audit. The reports may include links to the records for the individual computers—such that a system administrator can readily determine which computers have security vulnerabilities.

The security audit specifications can be readily changed and/or the reports customized for the respective groups by altering the associated security audit specification criteria. For example, a security audit may cover the entire organization, that is, the top level group, and check several key, agreed upon hotfixes that are specified by the head network administrator. In addition, administrators of various lower level groups may choose to add to the audit one or more hotfixes that they have tested and require for their respective groups. The security audit subsystem then produces reports for the various groups that include information about compliance with the applicable security audit specifications. For the top level group report, the system determines that a computer is compliant if it satisfies the network-wide security audit requirements, even if the computer does not satisfy requirements that are applicable to a lower level group of which the computer is a member. The system, however, determines that the same computer can be non-compliant for the audit report of the lower level group.

BRIEF DESCRIPTION OF THE DRAWINGS

The invention description below refers to the accompanying drawings, of which:

FIG. 2 depicts computer mapping database table for use by the system of FIG. 1;

FIG. 3 depicts a hotfix mapping database table for use by the system of FIG. 1;

FIG. 4 depicts a security audit mapping database table;

FIGS. 6 and 7—depict reports produced by the system of FIG. 1.

DETAILED DESCRIPTION OF AN ILLUSTRATIVE EMBODIMENT

Figure 1:
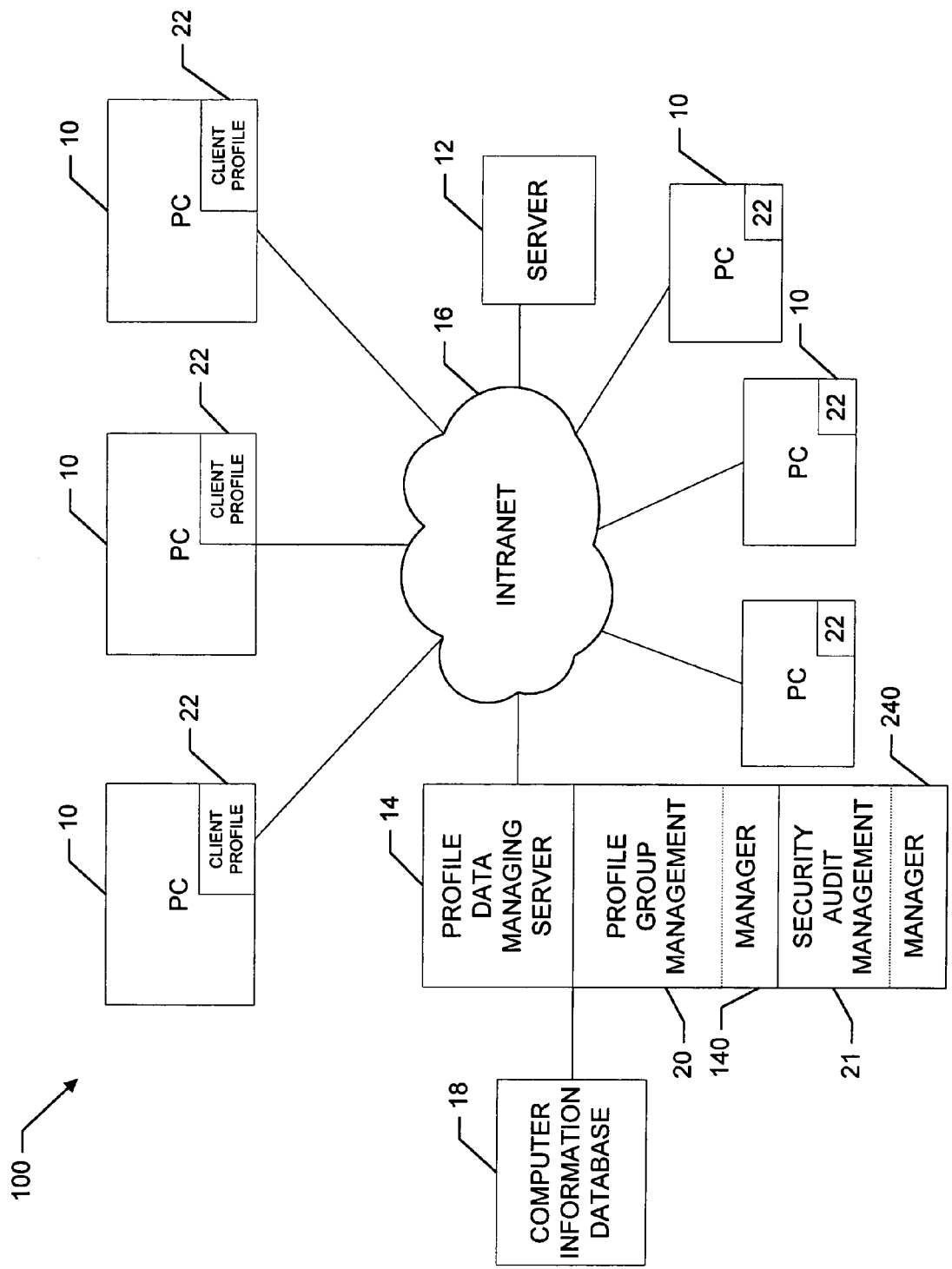
FIG. 1 is a functional block diagram of a system constructed in accordance with the current invention.

Referring now to FIG. 1, a company operates a network 100 that includes various computers 10, some of which may be workstations, laptops, servers or other devices (not shown) that communicate over an intranet, which is denoted in the drawing by the reference numeral 16. A server 14, which is the profile data managing server, manages a computer information database 18 that contains the profile data for the computers on the intranet 16 and any other computers (not shown) that are under company control. Hereinafter, all computers under the control of the company are referenced as "computers 10." The server 14 runs profile group management software, which is denoted in the drawing by the reference numeral 20, and security audit management software, which is denoted by the reference numeral 21. For ease of understanding, the server 14 will sometimes be referred to herein as the profile group manager 140 and/or the security audit manager 240 as depicted by dotted lines in the drawing.

The computers 10 run client profiling software that, at the respective computers, collects profile data and uploads the data to the profile data managing server 14. The client profiling software is denoted in the drawing by the reference numeral 22. The profile group manager 140 manages the computer profile data by grouping the computers into a specified tree-structure of groups, based on primary and/or secondary grouping criteria. The profile group manager then manipulates the data to produce reports that summarize the attributes of the computers in the various groups, with each report for a given group summarizing the attributes of the computers in the groups that are on a sub-tree with the given group as its root. The primary and secondary grouping criteria are based on selected methods of grouping, such as IP Address, Windows Domain, Windows Login, PC Name and so forth. The grouping criteria may be selected essentially to correspond to the underlying organization of the network 100 and/or the company, as described in the co-pending U.S. patent application Ser. No. entitled GROUPING OF COMPUTERS IN A COMPUTER INFORMATION DATABASE SYSTEM, filed Jul. 25, 2003.

The security audit manager 240 further manages the computer profile data using audit specification criteria, which may be customized by group level. The security audit manager manipulates the computer profile data to produce various database tables and views, as discussed in more detail below. The security audit manager also produces security audit reports that summarize the security audit status of the computers in the various groups.

The security audit report for a given group lists the number of computers 10 that are or alternatively are not compliant with the applicable security audit specifications. The security audit specifications for the respective groups are contained in a table that identifies required hot fixes for each of the groups. This table also includes information about the operating system platforms to which the respective hotfixes apply. The security audit subsystem uses the security audit specifications to determine the status of a given computer, that is, to determine if the computer his installed thereon all of the required hotfixes that apply to the computer. The security audit system then produces reports that summarize the results by group, and through hypertext links make available more detailed information about, for example, the non-compliant computers.

To provide the profile data, the client profiling software 22 on a given computer collects hardware and software configuration and performance data through hardware interfaces and operating system application programming interfaces as well as from various registries, files and so forth. The data includes:

Hardware component information such as manufacturer, system, BIOS, CPU, bus, memory, hard disks (local and shared, logical and physical), tape drives, video cards, sound cards, printers, network, and operating system;

Software version information about applications including manufacturer, product name, version number, and install directory;

Software License information about popular software packages installed on each computer, including Product Ids and Registration Numbers;

Login account list of local logins the computer allows and date of last login for each;

Performance data such as network activity, CPU utilization, number of reboots, and hard drive SMART failures;

hotfix data such as name, type, installation date, path, status; and

User Defined Entries such as name, address, phone number, location.

At designated times, the client computers connect to the profile data server 14 over the intranet 16 or, as appropriate, over the internet, to upload the collected data, or profiles.

Referring now also to FIG. 2, the security audit manager 240 produces a Computers Table 200, which includes entries for the respective computers 10 that have provided profile data to the system. The entry for a given computer 10 includes an Id field 202 that uniquely identifies the computer using the Universally Unique Identifier (UUID) found on the computer motherboard, and a GroupName field 203 that identifies the group to which the computer is assigned by the profile group manager 140.

The remaining fields of the Computers Table 200 contain information that relates to the computer's operating system platform. An OperatingSystem field 204 contains the common name of the operating system, e.g., Windows XP. An OSProductOptions field 205 contains the operating system product options data, e.g., Workstation, Server, Professional, Advanced Server, Home Edition and so forth. An OSServicePack field 206 contains the name of any installed service pack, and an OSBuild field 207 contains the operating system build number, which for Windows operating systems is returned by the Windows GetVersionEx API call. A record 208 for one of the computers 10 is depicted in the drawing.

Referring in addition to FIG. 3, the security audit manager 240 produces a table 300 that contains information relating to software updates and patches, which we are referring to herein as "hotfixes." Accordingly, we refer to the table 300 as the "Hotfixes Table." The Hotfixes Table 300 contains information relating to the respective hotfixes that are installed on the computers 10, and includes a record of every hotfix that is installed on every computer 10. The Hotfixes Table entry for a particular hotfix that is installed on a given computer includes an Id field 302 that identifies the computer by the UUID, and fields 303-308 that contain data that relate to the hotfix. The client profiling software 22 extracts the data for the hotfix-related fields from the identified computer's registry.

The Name field 303 contains the name of the registry key that contains data relating to the hotfix, hereinafter referred to as the "hotfix registry key." The Desc. field 304 contains the description string value, if any, included in the hotfix registry key. If the description string is not included in the hotfix registry key, a value of NULL is included in the Desc. field. An InstallDate field 305 contains the installed date string value from the hotfix registry key. A Qnumber field 306 contains the associated Qnumber or, as appropriate, KBnumber. For convenience, we refer to the Qnumber or KBnumber generically as the "Qnumber." The Q number is extracted from the description string, if there is one. Otherwise, the Qnumber is extracted from the name of the hotfix registry key. The Type field 307 contains the type string value, which is also extracted from the hotfix registry key. The Path field 308 contains the name of the registry key that contains the hotfix registry key and, as appropriate, the registry key name is prefixed with the name of the key above it. If the hotfix registry key is not contained within another meaningfully named registry key, the subsystem sets the Path field 308 to the NULL value, to indicate no path is found that indicates a product name or operating system platform to which the hotfix applies.

The Hotfixes Table 300 further includes a Status field 309 that contains an indication of whether on not the installed hotfix "verifies," that is, whether the installed hotfix and the hotfix data in the registry agree. The system determines if the hotfix verifies by, for example, checking the version number of the installed hotfix files against the version information in the registry, checking the associated catalogues, and so forth, in a known manner. The Status field may contain a bit that is set to one value if the hotfix verifies and set to another value if the hotfix does not verify. Alternatively, the Status field may include a code that indicates either that the hotfix verifies or a reason for the failure to verify.

The drawing depicts a record 310 for a particular hotfix, namely, Q314147, on a given computer 10. As discussed, there will be separate records for each of the hotfixes installed on the given computer 10. Further, there will be individual records for every hotfix installed on any computer 10 listed in the computer information database 18.

Referring now to FIG. 4, the security audit manager 240 produces a Security Audit Table 400 that includes the security audit specifications for the respective groups. The Security Audit Table has entries for the respective hotfixes that are to be included in the security audit of a given group. The system administrators for the groups select the hotfixes that are to be included in the security audits for their groups. The system administrators make the selections from a listing of the hotfixes that are installed on the network 100. The hotfix-available listing is derived from the Hotfixes Table 300, and is a view that selects the distinct name, path pairs found in the table.

Generally, one computer 10 or a subset of the computers on the network 100 is connected to download and install the hotfixes that are released by the companies that manage the operating system platforms, such as, for example, Microsoft. After successfully testing the hotfix for conflicts and so forth, the new hotfix may then be provided to one or more groups of computers, as appropriate. Alternatively, or in addition, a system administrator may monitor the releases and selectively install the hotfixes for testing purposes. When a newly installed hotfix is reported in the profile data, the subsystem updates the Hotfix Table 300 to include therein one or more entries that correspond to the newly-installed hotfix. The subsystem also updates the Hotfix-Available View, to include the hotfix.

The hotfix-available information may be provided to the system administrators via an interactive website through which the system administrators make their selections.

Generally, a system administrator will select a hotfix for inclusion in the security audit of the associated group only after the hotfix has been tested. Entries corresponding to the hotfix under test are, however, included in the Hotfixes Table 300 and thus in the Hotfix-Available View as soon as the hotfix is reported in the profile data.

The Security Audit Specification Table 400 includes the security audit specifications for all of the groups. As discussed above, the groups are determined by the group profile manager 140. The Security Audit Specification Table includes fields 402-404 that for a given entry identifies a group and the hotfix that is to be included in the security audit for that group. The GroupName field 402 contains the group name to which the security audit specification applies, and the Name field 403 and the Path field 404 include, respectively, the name and path of a hotfix that has been selected for inclusion in the security audit of the identified group. As discussed in more detail below, the hotfix name and the associated path information are obtained from a corresponding record in the Hotfix-Available View.

The Security Audit Specification Table includes two additional fields, namely, OS field 405 and SP field 406, that identify the operating system and the service pack, if any, below which the hotfix applies. Service packs numbered the same as or above the identified service pack include the named hotfix, and thus, the hotfix need not be separately installed on operating system platforms that include the higher numbered service packs. As discussed in more detail below with reference to FIG. 5, the security audit subsystem determines the information for the OS and SP fields 405 and 406 by manipulating the associated hotfix path and name information obtained from the fields 308 and 303 of an applicable record from the Hotfix Table 300. The drawing depicts a record 408 for the security audit of the high-level group "Acme\," and indicates that the security audit for that group includes hotfix "Q323255," which applies to the Windows XP operating system with a service pack below Service Pack 2.

Figure 5:
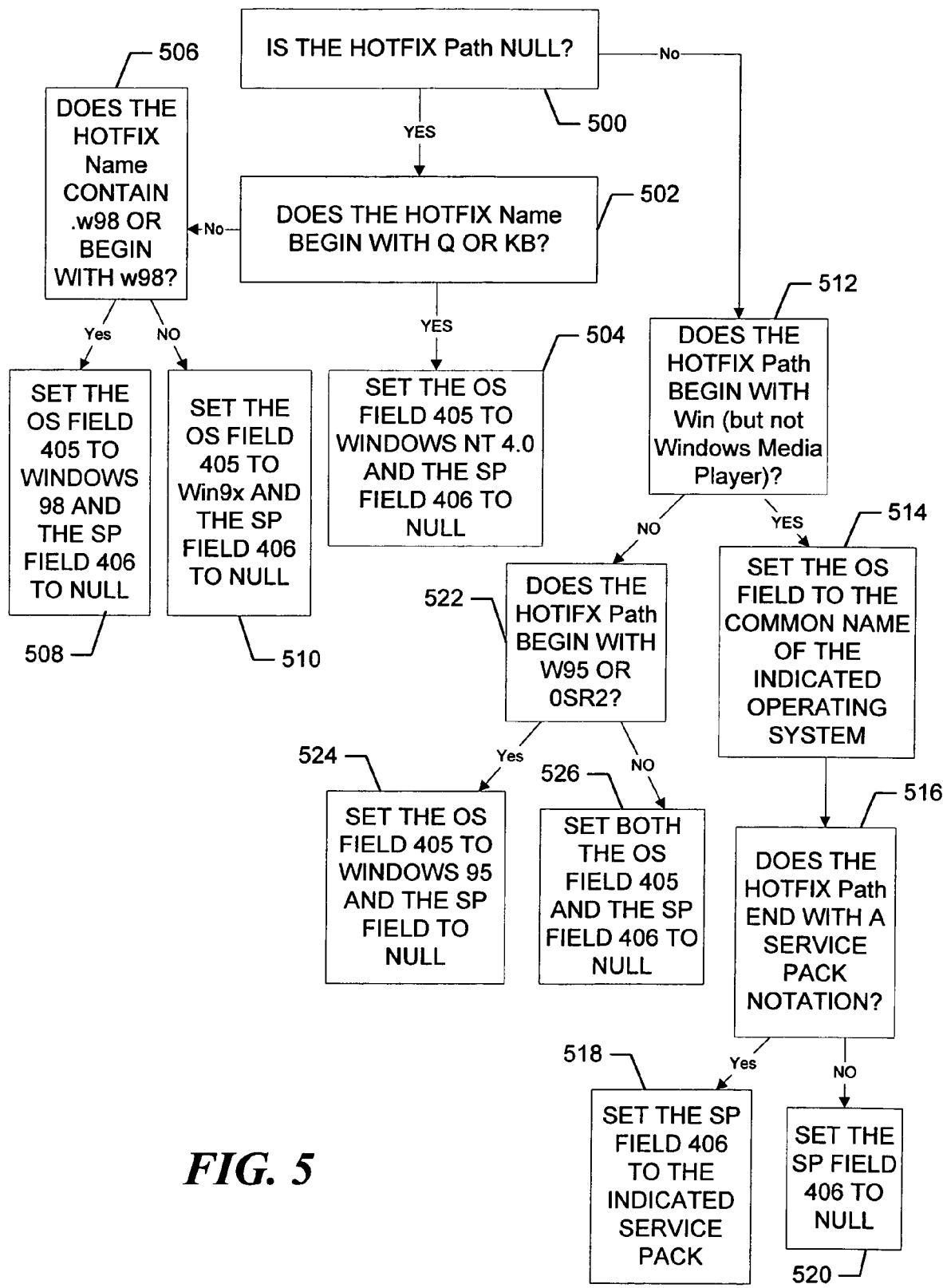
FIG. 5 is a flow chart of the operations of the system of FIG. 1 in filling in particular fields of the security audit table of FIG. 4.

Referring now to FIG. 5, the security audit subsystem sets the OS and SP fields 405 and 406 of the Security Audit Table 400 based on a manipulation of the contents of the Name and Path fields from the selected record of the Hotfix-Available View. The security audit subsystem extracts from the Hotfix-Available View the record that corresponds to the selected hotfix. The subsystem then determines the operating system platform(s) to which the selected hotfix applies based on the contents of the Name field and the Path field of the extracted record. The operations of the security audit subsystem in setting the OS and SP fields are described by way of an example that is based on Windows operating system platforms. However, similar processing steps may be performed based on other operating system platforms in addition to or in place of the Windows operating system platforms.

In step 500 the security audit subsystem determines if the Path field 308 in the extracted Hotfix-Available record contains the value NULL, which indicates that no meaningful path is specified in the registry for this hotfix. If the path value is NULL, the subsystem next determines if the Name field in the extracted record contains a hotfix name that begins with "Q" or with "KB" (step 502). If the name begins with Q or KB, the security audit subsystem sets the OS field 405 of the Security Audit Table record to Windows NT 4.0, since the hotfix applies only to that particular operating system. The system also sets the value of the SP field to NULL, to indicate that the hot fix applies to all service packs (step 504).

If the path field in the extracted record is set to NULL and the Name field 303 contains a name that does not begin with Q or KB, the security audit subsystem, determines if the name includes ".w98" or begins with "w98" (step 506). If so, the security audit subsystem determines that the hotfix applies to the Windows 98 operating system and sets the OS field 405 to Windows 98. The system also sets the SP field 406 to NULL (step 508). Otherwise, the security audit subsystem determines that the hotfix applies to Windows 95, 98 or Me operating system platforms, and the security audit subsystem sets the OS field 405 to Win9x and the SP field 406 to NULL (step 510).

If a path is specified in the extracted record, the security audit subsystem determines whether the path begins with "Win" and is other than "Windows Media Player" (step 512). If so, the security audit subsystem sets the OS field 405 to the common name of the operating system that is indicated in the path (step 514). For example, if that path begins with "Win98," the system sets the OS field 405 to Windows 98, and so forth. For the SP field 406, the security audit subsystem further checks if the path specifies a service pack, i.e., if the path ends with "\SP" followed by a numeral (step 516) and a final slash. If a hyphen is included between the SP and the number, the subsystem ignores the hyphen when recognizing and extracting the information. If a service pack is indicated, the system sets the SP field to the service pack (step 518). For example, if the end of the path is \SP3\, the system sets the SP field to the value Service Pack 3. Otherwise, if there is no service pack indicated in the path, the security audit subsystem sets the SP field to NULL (step 520).

If the specified path in the Hotfix Table record does not begin with "Win" the security audit subsystem determines if the path instead begins with either "W95" or "OSR2" (step 522). If so, the security audit subsystem sets the OS field 405 to Windows 95, and sets the SP field 406 to NULL (step 524). If the specified path in the Hotfix Table does not begin with "W95" or "OSR2," the security audit subsystem determines that the hotfix applies to all operating system platforms and the OS and the SP fields are both set to NULL (step 526).

Figure 6:
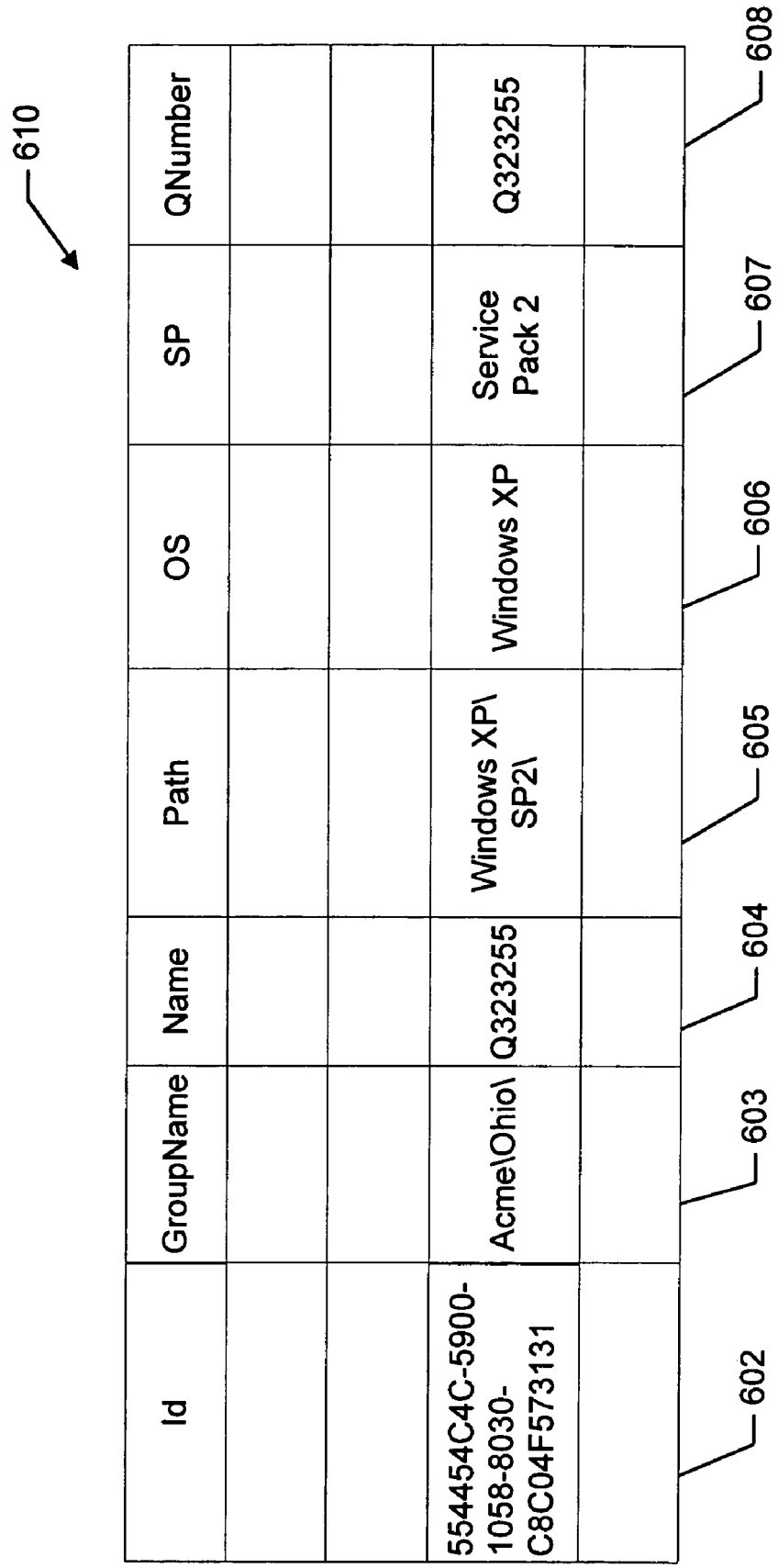

Using the various tables 200, 300 and 400, the security audit subsystem prepares database views of the security audit status of the computers 10. One view, which we refer to as a "Hotfixes Absent View," includes for each computer 10 records that identify the available hotfixes that are absent from, i.e., not installed on, the computer. As illustrated in FIG. 6, the security audit subsystem returns a record 600 that contains in an Id field 602 the computer's UUID, in a GroupName field 603 the name of the group to which the computer is assigned by the profile group manager 140, and in fields 604-607 the name, path, type and Qnumber associated with an available hotfix that is not installed on that particular computer. To produce the Hotfixes Absent View the subsystem cross joins the Computers Table 200 and the Hotfixes Table 300, and ignores the cross joined entries in which the cross joined hotfix is separately found in the Hotfixes Table 300 to be installed on the cross joined computer. In more detail, a cross joined entry is ignored where a record is found in the Hotfixes Table in which the contents of its Id field matches that of the crossed joined Computers Table Id field 202 and the contents of its Name field matches that of the cross joined Hotfixes Table Name field 303.

The security audit subsystem may also produce a Hotfixes Failed View, which includes records that indicate the hotfixes and the respective computer on which the hotfixes did not verify. The security system joins the Computers Table 200 and the HotfixesTable 300 based on matching Id fields 202 and 302, and selects for the view the joined entries in which the Status field 309 indicates a verification failure. The View contains the same Id, GroupName and hotfix name, type, path and Qnumber fields as the Hotfix Absent View.

The security audit subsystem also uses the security audit specifications from the Security Audit Specification Table 400 and produces a Security Audit Failures View for a given group. The view contains for each group records that indicate which particular computers are missing the required hotfixes. The security audit subsystem first joins the Hot Fixes Absent View with the Security Audit Specification Table based on matching Name fields 403 and 604, and the subsystem then selects those entries in which the Path fields match or in which the Path fields are both NULL. The subsystem next joins the results with the Computers Table 200 based on matching Id fields and selects from the joined entries those entries that correspond to computers that have operating system platforms to which the named hotfix applies.

The security audit subsystem determines if the hotfix applies to a given computer's operating system platform based on the OperatingSystem and OSServicePack fields in the selected joined entry and the OS and SP fields 405 and 406 in an associated entry from the Security Audit Specification Table 400. The subsystem first determines if the operating system named in the OperatingSystem field is consistent with the operating system information in the OS field 405. If the OS field 405 is NULL or if the OS field 405 begins with the common name contained in the OperatingSystem field, the subsystem determines that the operating systems are consistent. If, instead, the OS field 405 contains the value "Win9x," the subsystem determines the operating systems are consistent if the value in the OSBuild field 207 is equal to or greater than the predetermined minimum build number for Windows 95 which is 67108864 in decimal or hexadecimal 4000000 specifying all build numbers with major version 4. Otherwise, the subsystem determines that the hotfix does not apply to the computer's operating system platform.

If the operating systems are consistent, the subsystem next determines if the computer's operating system platform is consistent with any service pack requirement associated with the hotfix. If either the OSServicePack field or the SP field 406 are NULL, the subsystem determines that the hotfix applies to all service packs, and thus, to the computer's operating system platform. Otherwise, the subsystem determines if the service pack value contained in the SP field 406 is greater than the service pack value contained in the OSServicePack field. If so, the subsystem determines that the hotfix applies to the computer's operating system platform. If not, the subsystem determines that the hotfix does not apply.

The subsystem then selects from the results the records for which the group named in the GroupName field begins with the group name in the GroupName field 402 of the Security Audit Specification Table 400. As illustrated in FIG. 6, the Security Audit Failures View includes Id, GroupName, Name, Path, OS, SP and Qnumber fields. The illustrated Security Audit Failures record 610 indicates that the identified computer is missing the Q323255 hotfix, which is both required by the Acme\Ohio\ group security audit specifications and applicable to the computer's operating system platform.

Referring now to FIG. 7, the security audit subsystem may also produce a Security Audit View that is a summary of the results contained in the Security Audit Failures View. The subsystem thus counts the number of computers within a specified group that do not have installed thereon a particular hotfix, by counting the associated records in the Security Audit Failure View. A Security Audit View record is illustrated in the drawing and indicates that 7 computers in or below the named group do not have the required, applicable hotfix Q323255 installed thereon. Similar records may be produced for each hotfix required by the Acme\Ohio\ group security audit specifications.

Using the various views discussed above, the security audit subsystem produces security audit reports that summarize the security audit results by group. The network administrator may request a security audit report that summarizes whether or not the computers comply with the network-wide security audit specifications, that is, with the top level security audit specifications. Further, various lower-level group system administrators may request security audit reports that indicate whether their respective groups of computers further comply with group-specific security audit specifications. The hotfixes listed in the group security audit reports are preferably hyperlinked to reports that provide details of the computers that are missing the hotfixes. In the example, the hyperlink provides the results of querying the Security Audit Failures View for records that include the hotfix name, path, operating system and service pack information from the selected entry in the security audit summary report and also contain the name of the specified group.

As discussed, the groups may correspond to the various departments or organizational units of a given company, all as described in the co-pending U.S. patent application Ser. No. entitled GROUPING OF COMPUTERS IN A COMPUTER INFORMATION DATABASE SYSTEM, filed Jul. 25, 2003, and the reports are thus customized by department or organizational unit. Accordingly, the system administrator of a particular group can request a summary report for that group and through hyperlinks from the summary obtain the more detailed information about the computers within the group. Similarly, higher level system administrators may obtain information in the detail they desire about their respective groups, using the hyperlinks from the applicable summaries.

As is evident to those skilled in the art, the security audit subsystem produces reports based on selected security audit specifications, groups, and so forth by selecting pertinent records based on associated value-to-match fields from the various tables and views. Additionally, the system may produce summaries that are based on the groups, and/or the security audit specifications specified by the group system administrators, and include in the various reports the attributes of the operating system platform to which the associated hotfixes apply. Further, the reports, summaries, and associated views can be readily updated when the membership of the groups and/or the security specifications for the groups change, by using the corresponding new group and/or new security audit specification criteria. In addition, when the profile data indicates a new hotfix has been installed, the system readily updates the various tables and views by adding corresponding entries thereto, and through the views also updates the associated reports and summaries.

What is claimed is:

1. A method of managing a computer information database that contains computer profile data for computers, the method including the steps of:
   A. determining a tree structure of groups for the computers based on grouping criteria;
   B. determining associated software update and patch audit specifications for respective groups based on audit specification criteria;
   C. including in one or more database tables fields that correspond to one or both of the grouping criteria and the audit specification criteria for the computers, and including in the fields in respective table records values for profile data of interest that correspond to one or both of the groups and the associated audit specifications;

D. manipulating the data from the database to produce database views that provide details of the computers that comply with or fail to comply with applicable audit specifications.

2. The method of claim 1 further including the step of producing audit reports that summarize the contents of one or more of the views and provide hypertext links to the applicable records contained in the one or more views.

3. The method of claim 1 further including the step of including in one of more of the fields of the tables information that identifies the respective groups to which the record values apply, the operating system platforms to which the respective audit specifications apply or both.

4. The method of claim 3 further including the steps of
manipulating the profile data to determine the operating system platforms to which the respective audit specifications apply, and
including in the table with one or more fields that correspond to the security audit specification criteria information that identifies the operating system platforms to which individual audit specifications apply.

5. The method of claim 4 wherein the step of manipulating the data to produce a view further includes determining for computers with the applicable operating system platforms which computers comply or do not comply with the associated security audit criteria.

6. The method of claim 1 wherein the step of manipulating the data to produce a view further includes determining which computers comply or do not comply with individual audit criterion.

7. The method of claim 1 wherein the step of including in the database tables further includes the steps of:
including in one table information that for every computer identifies the operating system platform and the group to which the computer is assigned, and
including in a second table information that for every audit specification identifies the group and the operating system platform to which the specification applies.

8. The method of claim 7 wherein the step of producing views further includes producing a view that for every computer includes records that identify the audit specifications to which the computer does not comply.

9. A method for managing a database that contains computer profile data for a plurality of computers, the method including the steps of
grouping the plurality of computers in groups that are nodes of a tree in accordance with user-specified grouping criteria that are respective values of computer profile data of interest;
associating audit specifications with the respective groups in accordance with user-specified audit specification criteria and system-specified criteria that are associated with values produced by the manipulation of computer profile data of interest; and
manipulating the database data to produce summaries of attributes of the computers in a given group and in the groups in the subtree that has the given group as its root, the summaries including information relating to the number of computers that comply with or that do not comply with the audit specifications that are applicable both to the given group and to the respective computers.

10. The method of claim 9 wherein the system-specified audit specification criteria are produced by manipulating profile data associated with the operating system platforms of the computers that have installed thereon the software updates or patches that are the subject of the respective audit specifications to identify computer operating system platforms to which the audit specifications apply.

11. The method of claim 10 wherein the step of assigning includes re-assigning the audit specifications to the groups in accordance with different user-specified audit specification criteria.

12. The method of claim 9 wherein the step of manipulating the database further includes the steps of
producing database tables in which the grouping criteria, the audit specification criteria or both are included in one or more fields, and
producing views that include respective computers that have installed thereon or do not have installed thereon the subjects of the respective audit specifications, and
linking the views to the summaries to provide the attributes of the computers included in the summaries.

13. The method of claim 12 wherein the step of grouping includes re-grouping the plurality of computers in groups in accordance with different user-specified grouping criteria.

* * * * *